United States Patent [19]
Porret et al.

[11] 3,948,916

[45] Apr. 6, 1976

[54] DIGLYCIDYL COMPOUNDS OF N-HETEROCYCLIC COMPOUNDS

[75] Inventors: Daniel Porret, Binningen; Jürgen Habermeier, Pfeffingen; Willy Fatzer, Bottmingen; Dieter Baumann, Birsfelden, all of Switzerland

[73] Assignee: Ciba-Geigy AG, Basel, Switzerland

[22] Filed: Sept. 13, 1973

[21] Appl. No.: 396,931

Related U.S. Application Data

[63] Continuation-in-part of Ser. No. 135,485, April 19, 1971, abandoned.

[30] Foreign Application Priority Data

Apr. 20, 1970 Switzerland................... 5878/70

[52] U.S. Cl. ............ 260/260; 260/2 FP; 260/2 EA; 260/2 N; 260/309.5; 260/37 R; 260/57 R; 260/78.4 EP; 260/69 N; 260/72 R

[51] Int. Cl.²........................................ C07D 239/20

[58] Field of Search......................... 260/260, 309.5

[56] References Cited

UNITED STATES PATENTS

| | | | |
|---|---|---|---|
| 3,629,263 | 12/1971 | Batzer et al........................ | 260/260 |
| 3,772,326 | 11/1973 | Batzer et al...................... | 260/309.5 |

*Primary Examiner*—Richard J. Gallagher
*Assistant Examiner*—Anne Marie T. Tighe
*Attorney, Agent, or Firm*—Vincent J. Cavalieri

[57] ABSTRACT

New diglycidyl compounds of mononuclear, five-membered or six-membered, unsubstituted or substituted, hydroxyalkylated N-heterocyclic compounds, produced by addition of formaldehyde or acetaldehyde to mononuclear, five-membered or six-membered, unsubstituted or substituted, N-heterocyclic compounds, for example hydantoin or dihydrouracil, to monohydroxyalkyl compounds, and subsequent glycidylation of the OH group and NH group to give the corresponding glycidyl compounds.

7 Claims, No Drawings

DIGLYCIDYL COMPOUNDS OF N-HETEROCYCLIC COMPOUNDS

This application is a continuation-in-part-application of our copending application Ser. No. 135,485, filed Apr. 19, 1971 now abandoned.

The subject of the present invention are new, mononuclear N-heterocyclic diglycidyl compounds of the formula

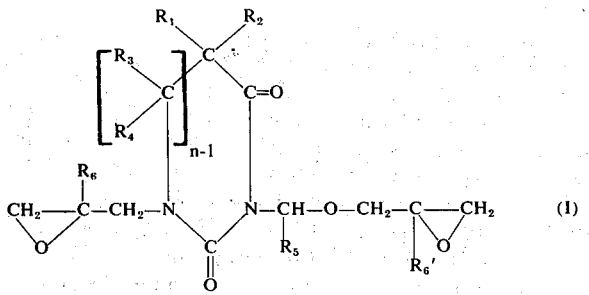

wherein $R_5$ represents a hydrogen atom or the methyl group and wherein $R_1$ and $R_3$ independently of one another each denote a hydrogen atom or an aliphatic, cycloaliphatic, araliphatic or aromatic hydrocarbon radical, such as, especially, a lower alkyl radical with 1 to 4 carbon atoms and $R_2$ and $R_4$ each represent an alkyl radical, especially a lower alkyl radical with 1 to 4 carbon atoms, or a hydrogen atom, or wherein $R_1$ and $R_2$ together form a divalent aliphatic or cycloaliphatic hydrocarbon radical, preferably a tetramethylene or pentamethylene radical, $R_6$ and $R_6'$ independently of one another each represent a hydrogen atom or the methyl group, and n denotes an integer having a value of 1 or 2.

In the abovementioned formula (I), the radicals $R_1$, $R_2$ and $R_3$ preferably denote either a hydrogen atom or a $C_1$-$C_4$-alkyl, or the radical $R_4$ denotes a hydrogen atom.

N,N'-diglycidyl compounds of hydantoin are already known from British Pat. No. 1,148,570, and the N,N'-diglycidyl compounds of dihydrouracil are already known from Belgian Pat. No. 736,970. As compared to these known compounds, the new compounds of the formula (I) display better processability (lower viscosity coupled with longer gelling times) when using polycarboxylic anhydrides as curing agents. Furthermore, the shaped articles obtained from the new epoxide compounds of the formula (I) by curing with polycarboxylic anhydrides are distinguished, in comparison to the shaped articles manufactured from the known epoxide compounds, by better mechanical properties in relation to the heat distortion point (according to Martens).

The new diglycidyl compounds of the formula (I) can be manufactured by reacting compounds of the formula

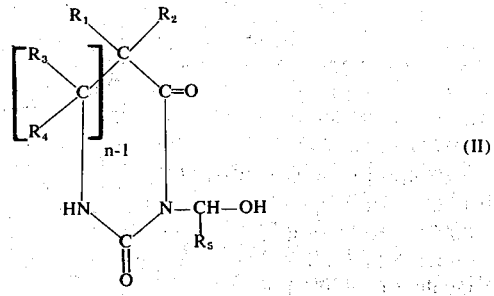

wherein $R_1$, $R_2$, $R_3$, $R_4$, $R_5$ and n have the same meaning as in formula (I), in one or more stages with an epihalogenohydrin or β-methylepihalogenohydrin such as, for example, epichlorohydrin, β-methylepichlorohydrin or epibromohydrin, in a manner which is in itself known.

In the one-stage process, the reaction of the epihalogenohydrin with a compound of the formula (II) takes place in the presence of alkali, sodium hydroxide or potassium hydroxide being used preferentially. In this one-stage process, the epichlorohydrin which is used for the reaction according to the process can be replaced wholly or partly by dichlorohydrin, which is transiently converted to epichlorohydrin under the process conditions and on appropriate addition of alkali, and then reacts as epichlorohydrin with a compound of the formula (II). In the preferentially used two-stage process, the compound of the formula (II) is added to an epihalogenohydrin in a first stage, in the presence of acid or basic catalysts, to give the product containing epihalogenohydrin groups, and thereafter this product is dehydrohalogenated in a second stage by means of alkalis, such as potassium hydroxide or sodium hydroxide, to give the diglycidyl compound.

Suitable acid catalysts in the two-stage process are especially Lewis acids, such as, for example, $AlCl_3$, $SbCl_5$, $SnCl_4$, $FeCl_3$, $ZnCl_2$, $BF_3$ and their complexes with organic compounds.

The reaction can also be accelerated by addition of other suitable catalysts, for example alkali hydroxides, such as sodium hydroxide, and alkali halides, such as lithium chloride, potassium chloride, sodium chloride, sodium bromide and sodium fluoride. The new diglycidyl compounds of the formula (I), according to the invention, are preferably manufactured by reacting an epihalogenohydrin, preferably epichlorohydrin, with a compound of the formula (II) in the presence of a basic catalyst, such as, preferably, a tertiary amine or a quaternary ammonium base or a quaternary ammonium salt, and treating the resulting product, containing halogenohydrin groups, with agents which split off hydrogen halide.

Suitable catalysts for the addition of epichlorohydrin are above all tertiary amines, such as triethylamine, tri-n-propylamine, benzyldimethylamine, N,N-dimethylaniline and triethanolamine; quaternary ammonium bases, such as benzyl-trimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; also ion exchange resins having tertiary or quaternary amino groups; also trialkylhydrazonium salts, such as trimethylhydrazonium iodide. Alkali halides, such as lithium chloride, sodium chloride or potassium chloride, are also suitable.

Further suitable catalysts are also low molecular thioethers and sulphonium salts, or compounds which by means of the epihalogenohydrins can be converted into thioethers or sulphonium compounds, such as hydrogen sulphide, sodium sulphide or mercaptans.

As such thioethers or sulphonium salts there may be mentioned: diethyl-sulphide, β-hydroxyethyl-ethyl-sulphide, β-hydroxypropyl-ethyl-sulphide, ω-hydroxy-tetramethylene-ethyl-sulphide, thiodiglycol, mono-β- cyanoethyl-thioglycol-ether, dibenzyl-sulphide, benzyl-ethyl-sulphide, benzyl-butyl-sulphide, trimethylsulphonium iodide, tris(β-hydroxyethyl)sulphonium chloride, dibenzylmethylsulphonium bromide, 2,3-epoxypropylmethylethyl sulphonium iodide, dodecyl-methyl-sulphide and dithian.

Strong alkalis, such as anhydrous sodium hydroxide or aqueous sodium hydroxide solution, are as a rule used for the dehydrohalogenation, but other alkaline reagents, such as potassium hydroxide, barium hydroxide, calcium hydroxide, sodium carbonate or potassium carbonate can also be used.

The dehydrohalogenation can, in turn, be carried out in several stages. Thus it is possible first to carry out a treatment with solid sodium hydroxide or potassium hydroxide at elevated temperature, and after distilling off the excess epihalogenohydrin to heat the residue in an inert solvent with a less than equivalent amount of concentrated alkali hydroxide solution, for example 50% strength sodium hydroxide solution.

Possible epihalogenohydrins are epibromohydrin, β-methyl-epichlorohydrin and above all epichlorohydrin.

Good yields are obtained if an excess of epichlorohydrin and in particular preferably 4 to 40 mols of epichlorohydrin, are used per hydroxyl group or NH group. During the first reaction, before the addition of the alkali, a partial epoxidation of the bis-chlorohydrin-ether of a compound of the formula (II) already takes place. The epichlorohydrin, which acts as a hydrogen chloride acceptor, is thereby partially converted into glycerine-dichlorohydrin. The latter is reconverted to epichlorohydrin on treatment with alkali.

The compounds of the general formula (II) are obtained in a known manner by adding formaldehyde or acetaldehyde to mononuclear N-heterocyclic compounds of the general formula

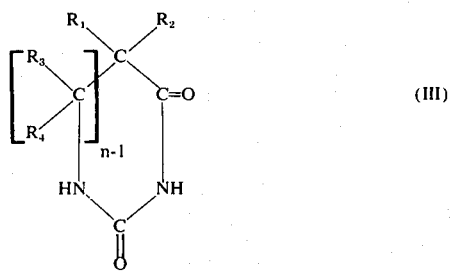

(III)

wherein $R_1$, $R_2$, $R_3$, $R_4$ and $n$ have the same meaning as in the formula (I), in an aqueous medium in accordance with the process described in British Pat. No. 564,424. The mononuclear N-heterocyclic compounds of the formula (III) used for the manufacture of the aldehyde addition products of the formula (II) are above all hydantoin, hydantoin derivatives, dihydrouracil and dihydrouracil derivatives.

Hydantoin and its preferred derivatives correspond to the general formula

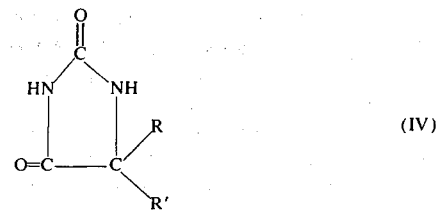

(IV)

wherein R and R' each denote a hydrogen atom or a lower alkyl radical with 1 to 4 carbon atoms, or wherein R and R' together form a tetramethylene or pentamethylene radical. Hydantoin, 5-methyl-hydantoin, 5-methyl-5-ethylhydantoin, 5-n-propyl-hydantoin, 5-isopropyl-hydantoin, 1,3-diaza-spiro(4,5)-decane-2,4-dione, 1,3-diaza-spiro(4,4)-nonane-2,4-dione and preferably 5,5-dimethyl-hydantoin may be mentioned.

Dihydrouracil (= 2,4-dioxo-hexahydropyrimidine) and its preferred derivatives correspond to the general formula

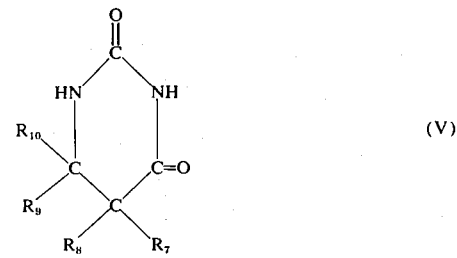

(V)

wherein $R_7$ and $R_8$ both denote a hydrogen atom or identical or different alkyl radicals, preferably alkyl radicals with 1 to 4 carbon atoms, and $R_9$ and $R_{10}$ independently of one another each denote a hydrogen atom or an alkyl radical.

Preferably, in the above formula, both radicals $R_7$ and $R_8$ denote methyl groups, $R_9$ denotes a hydrogen atom or a lower alkyl radical with 1 to 4 carbon atoms and $R_{10}$ denotes a hydrogen atom. 5,6-Dihydrouracil, 5,5-dimethyl-5,6-dihydrouracil (2,4-dioxo-5,5-dimethylhexahydropyrimidine) and 5,5-dimethyl-6-isopropyl-5,6-dihydrouracil (2,4-dioxo-5,5-dimethyl-6-isopropylhexahydropyrimidine) may be mentioned.

The new diglycidyl compounds of the formula (I), according to the invention, react with the customary curing agents for polyepoxide compounds and can therefore be cross-linked or cured by addition of such curing agents analogously to other polyfunctional epoxide compounds or epoxide resins. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4-amino-3-methylcyclohexyl)methane, 3,5,5-trimethyl-3-(aminomethyl)cyclohexylamine ("isophoronediamine"), Mannich bases, such as 2,4,6-tris(dimethylaminomethyl)phenol; m-phenylenediamine, p-phenylenediamine, bis(4-aminophenyl)methane, bis(4-aminophenyl) sulphone, m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxides, such as diomethane-polyglycidylethers; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine and dimerised or trimerised unsaturated fatty acids, such as dimerised linseed oil fatty acid (VERSAMID); polymeric polysulphides (THIOKOL); dicyandiamide, aniline-formaldehyde resins; polyhydric phenols, for example resorcinol, 2,2-bis(4-hydroxyphenyl)propane or phenolformaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Curing accelerators can furthermore be employed during curing; when using polyamides, dicyandiamide, polymeric polysulphides or polycarboxylic anhydrides as curing agents, suitable accelerators are, for example, tertiary amines, their salts or quaternary ammonium compounds, for example 2,4,6-tris(dimethylaminomethyl)phenol, benzyldimethylamine, 2-ethyl-4-methylimidazole, 4-amino-pyridine and triamylammonium phenolate; and also alkali metal alcoholates, such as, for example, sodium hexanetriolate. When curing is carried out with amines, monophenols or polyphenols, such as phenol or diomethane, salicylic acid or thiocyanates can for example be used as accelerators.

The term "curing", as used here denotes the conversion of the above diepoxides into insoluble and infusible cross-linked products, and in particular as a rule with simultaneous shaping to give shaped articles, such as castings, pressings or laminates and the like, or to give "sheet-like structures," such as coatings, coverings, lacquer films or adhesive bonds.

Depending on the choice of the curing agent, the curing can be effected at room temperature (18°–25°C) or at elevated temperature (for example 50°–180°C).

The curing can, if desired, also be carried out in 2 stages, by first prematurely stopping the curing reaction, or carrying out the first stage at only moderately elevated temperature, whereby a curable precondensate which is still fusible and soluble (a so-called "B-stage") is obtained from the epoxide component and the curing agent component. Such a precondensate can for example be used for the manufacture of "prepregs", compression moulding compositions or sintering powders. The new diglycidyl compounds are more or less mobile liquids. They can also be advantageously used mixed with other curable diepoxide or polyepoxide compounds.

As such there may, for example, be mentioned: polyglycidyl ethers of polyhydric alcohols, such as polyethylene glycols, polypropylene glycols or 2,2-bis(4'-hydroxycyclohexyl) propane; polyglycidyl ethers of polyhydric phenols, such as 2,2-bis(4'-hydroxyphenyl)-propane (= diomethane), 2,2-bis(4'-hydroxy-3',5'-dibromo-phenyl)propane, bis(4-hydroxyphenyl) sulphone, 1,1,2,2-tetrakis(4-hydroxyphenyl)ethane, 1,3-di(2'-hydroxy-n-propyl)-5,5-dimethylhydantoin or condensation products of formaldehyde with phenols manufactured in an acid medium, such as phenol novolacs or cresol novolacs; polyglycidyl esters of polycarboxylic acids, such as, for example, phthalic acid diglycidyl ester, isophthalic acid diglycidyl ester, tetrahydrophthalic acid diglycidyl ester, tetrahydrophthalic acid diglycidyl ester or hexahydrophthalic acid diglycidyl ester; triglycidylisocyanurate, N,N'-diglycidyl-5,5-dimethylhydantoin, 1-glycidyl-3-(2'-glycidyloxy-n-propyl)-5,5-dimethylhydantoin, aminopolyepoxides, such as are obtained by dehydrohalogenation of the reaction products of epihalogenohydrin and primary or secondary amines, such as aniline or 4,4'-diaminodiphenylmethane; further, alicyclic compounds containing several epoxide groups, such as vinyl cyclohexene-diepoxide, dicyclopentadiene-diepoxide, ethylene glycol-bis-(3,4-epoxy-tetrahydrodicyclopentadien-8-yl)-ether, (3',4'-epoxycyclohexyl-methyl)-3,4-epoxycyclohexanecarboxylate, (3',4'-epoxy-6'-methylcyclohexylmethyl)-3,4-epoxy-6-methylcyclohexanecarboxylate, bis(2,3-epoxycyclopentyl)-ether or 3-(3',4'-epoxycyclohexyl)-2,4-dioxa-spiro-(5,5)-9,10-epoxy-undecane.

If desired, other known reactive diluents, for example styrene oxide, butyl glycidyl ether, isooctyl glycidyl ether, phenyl glycidyl ether, cresyl glycidyl ether and glycidyl esters of synthetic, highly branched, mainly tertiary aliphatic monocarboxylic acids (CARDURA E) can be used conjointly.

A further subject of the present invention are therefore curable mixtures which are suitable for the manufacture of shaped articles, including two-dimensional structures, and which contain the diglycidyl compounds according to the invention, optionally together with other diepoxide or polyepoxide compounds, and also curing agents for epoxide resins, such as polyamines or polycarboxylic anhydrides.

The diepoxides according to the invention, or their mixtures with other polyepoxide compounds and/or curing agents, can furthermore be mixed, in any stage before curing, with customary modifiers, such as extenders, fillers and reinforcing agents, pigments, dyestuffs, organic solvents, plasticisers, flow control agents, agents for conferring thixotrophy, flameproofing substances or mould release agents.

As extenders, reinforcing agents, fillers and pigments which can be employed in the curable mixtures according to the invention, there may, for example, be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel (AEROSIL), lithopones, barytes, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, and ethylene glycol monomethyl ether, monoethylether and monobutyl ether.

Dibutyl phthalate, dioctyl phthalate and dinonyl phthalate, tricresyl phosphate, trixylenyl phosphate and polypropylene glycols can, furthermore, for example, be employed as plasticisers for modifying the curable mixtures.

Silicones, cellulose acetobutyrate, polyvinyl butyral, waxes, stearates and the like (which in part are also used as mould release agents) can for example be added as flow control agents when employing the curable mixtures, especially in surface protection.

Particularly for use in the lacquer field, the diepoxide compounds can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner with the aid of known mixing equipment (stirrers, kneaders, rollers and the like).

The curable epoxide resin mixtures according to the invention are above all employed in the fields of surface protection, the electrical industry, laminating processes and and the building industry. They can be used, in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, parts denote parts by weight and percentages denote percentages by weight, unless otherwise stated. The relationship of parts by volume to parts by weight is as of the milliliter to the gram.

For determining the mechanical and electrical properties of the curable mixtures described in the examples which follow, sheets of size 92 × 42 × 12 mm were manufactured for determining the flexural strength, deflection, impact strength and water absorption. The test specimens (60 × 10× 4 0 mm) for determining the water absorption and for the flexural test and impact test (VSM 77, 103 and VSM 77,105 respectively) were machined from the sheets.

Test specimens of sizes 120 × 15 × 10 mm were in each case cast for determining the heat distortion point according to Martens (DIN 53,458).

Sheets of sizes 120 × 120 × 4 mm were cast for testing the arcing resistance and tracking resistance (VDE 0303).

A. Manufacture of the diglycidyl compounds

EXAMPLE 1

Glycidylation of 3-hydroxymethyl-5,5-dimethylhydantoin

A mixture of 632.8 g of 3-hydroxymethyl-5,5-dimethylhydantoin (4 mols), 4440.0 g of epichlorohydrin (48 mols) and 19.9 g of tetraethylammonium chloride is heated to 60°C whilst stirring. A clear, colourless solution is thereby produced. As soon as the reaction mixture has reached 60°C, 768.0 g of 50% strength sodium hydroxide solution are slowly added dropwise over the course of 90 minutes at 55°–58°C. At the same time the water present in the reaction mixture is continuously removed from the batch by azeotropic circulatory distillation at 60–90 mm Hg, and is separated off. After the dropwise addition of the caustic alkali, the last traces of water are completely removed from the system over the course of 10 minutes. Thereafter, the sodium chloride produced is immediately filtered off and rinsed with 350 ml of epichlorohydrin. The combined epichlorohydrin solutions are cooled to room temperature and washed three times with 100 ml portions of water to remove traces of alkali and of sodium chloride. After separating off the water layer, the mixture is concentrated on a rotary evaporator at 60°C under a slight vacuum, and thereafter dried to constant weight (about 5 hours) at 85°C and 0.1 mm Hg.

881 g (81.7% of theory) of a light yellow, clear, liquid epoxide resin containing 6.9 epoxide equivalents per kg (93.1% of theory) are obtained. Elementary analysis shows the following results:

| found | calculated for 3-glycidyl-oxymethyl-1-glycidyl-5,5-dimethylhydantoin | calculated for 1,3-diglycidyl-hydantoin |
|---|---|---|
| 53.37% C | 53.32% C | 54.99% C |
| 6.88% H | 6.71% H | 6.71% H |
| 10.38% N | 10.37% N | 11.66% N |
| 0.63% Cl | 0.00% Cl | 0.00% Cl |

It can be seen from these values that practically no splitting off of formaldehyde, which would have lead to 1,3-diglycidyl-5,5-dimethylhydantoin, had occurred during the glycidylation reaction.

The presence of 3-glycidyloxymethyl-1-glycidyl-5,5-dimethylhydantoin is furthermore proved by the NMR spectrum.

The proton-magnetic resonance spectrum (60 Mc H—NMR, recorded in CDCl₃ at 35°C, with tetramethylsilane as an internal standard) shows, through the presence of the following signals, that in the main a diglycidyl compound having the structure given below has been produced:

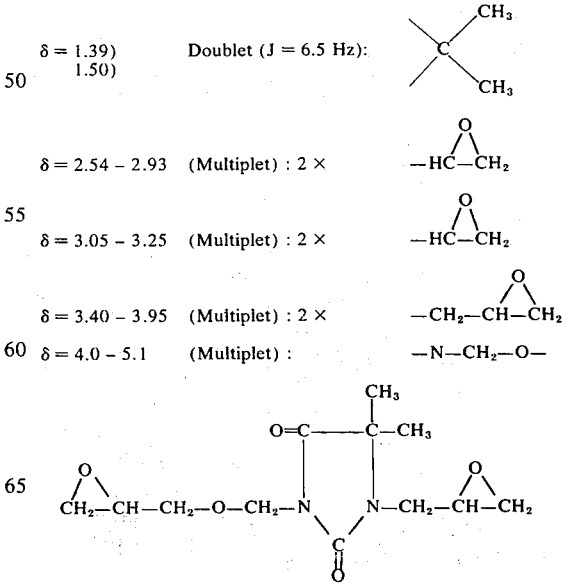

5 hours' warming to 70°C changes neither the viscosity (initial value approx. 5500 cP/25°C) nor the epoxide content, and a proton-magnetic resonance spectrum which is identical to the non-aged resin is obtained.

On heating to 130°C for 30 hours, the epoxide content drops to about 85% of the initial value, the viscosity increases greatly, but a proton-magnetic resonance spectrum shows that the content of —O—CH$_2$—N— groups has remained practically constant.

EXAMPLE 2

Glycidylation of 3-(1'-hydroxyethyl)-5,5-dimethylhydantoin 159.0 g of 3-(1'-hydroxyethyl)-5,5-dimethylhydantoin (melting point = 146°C; decomposition) (0.925 mol) together with 1027 g of epichlorohydrin (11.1 mols) and 4.6 g of tetraethylammonium chloride are warmed to 60°C whilst stirring. 177 g of 50% strength sodium hydroxide solution are then added dropwise over the course of 140 minutes, at 60°C, whilst stirring vigorously; at the same time, the water is distilled off continuously as described in Example 1. The mixture is worked up in accordance with Example 1.

It is possible to isolate 225 g of a light brown, liquid epoxide resin (86% of theory), the epoxide content of which corresponds to 7.4 equivalents/kg; the total chlorine content is 1.1%.

EXAMPLE 3

Glycidylation of 3-hydroxymethyl-5-isopropylhydantoin

A mixture of 171.2 g of 3-hydroxymethyl-5-isopropylhydantoin (1.0 mol), 1850 g of epichlorohydrin (20 mols) and 4.97 g of tetraethylammonium chloride (3 mol per cent) is warmed to 60°C whilst stirring. 192.0 g of 50% strength sodium hydroxide solution (2.4 mols) are then added dropwise over the course of 2 hours at 53°–58°C and under 60–90 mm Hg; in the course thereof, the water present in the reaction mixture is removed as described in Example 1. The mixture is worked up in accordance with Example 1.

270 g of a pale yellow, clear, viscous resin (95.4% of theory) containing 6.76 epoxide equivalents per kg (95.7% of theory) are obtained. The total chlorine content is 0.6%. The proton-magnetic resonance spectrum (60 Mc H—NMR, recorded in CDCl$_3$ at 35°C using tetramethylsilane as an internal standard) shows, through the presence of the following signals, that essentially an epoxide resin of the structure given below has been produced:

δ = 0.8 – 1.3 (Multiplet)

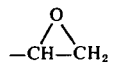

δ = 2.1 – 2.4 (Multiplet)

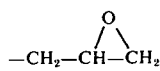

δ = 2.53 – 2.91 (Multiplet)

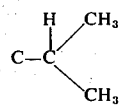

δ = 3.0 – 3.3 (Multiplet)

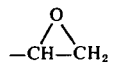

δ = 3.5 – 4.0 (Multiplet)

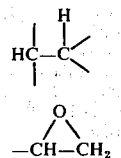

δ = 4.1 – 5.9 (Multiplet)

>N—CH$_2$—O

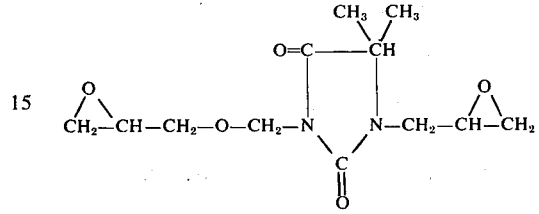

EXAMPLE 4

Glycidylation of 3-hydroxymethyl-5,5-tetramethylenehydantoin 125 g of 3-hydroxymethyl-5,5-tetramethylenehydantoin (0.682 mol), 1258 g of epichlorohydrin (13.64 mol) and 3.4 g of tetraethylammonium chloride are mixed, and the mixture is warmed to 60°C whilst stirring, whereby a clear, colourless solution is produced. Dehydrohalogenation is then carried out, as described in Example 1, with 130.5 g of 50% strength sodium hydroxide solution under 60-90 mm Hg at 58°–60°C, whilst stirring vigorously and continuously removing water from the system. Working up is also carried out in accordance with Example 1.

181.5 g (90% of theory) of a light yellow, clear, viscous liquid with 6.77 epoxide equivalents per kg (100% of theory) are obtained. The total chlorine content is about 0.5%.

EXAMPLE 5

Glycidylation of 3-hydroxymethyl-5-ethyl-5-methylhydantoin 172.2 g of 3-hydroxymethyl-5-ethyl-5-methylhydantoin (1.0 mol), 1850 g of epichlorohydrin and 4.97 g of tetraethylammonium chloride are mixed and dissolved whilst warming to 60°C. Dehydrohalogenation is then carried out, as described in Example 1, with 192.0 g of 50% strength sodium hydroxide solution at 57°–59°C, whilst continuously separating off water.

After working up in accordance with Example 1, 265 g (91.8% of theory) of a yellow, clear, viscous resin with 7.05 epoxide equivalents/kg (100% of theory) are obtained. The total chlorine content is 0.6%.

The proton-magnetic resonance spectrum (60 Mc H—NMR, recorded in CDCl$_3$ at 35°C with tetramethylsilane as the internal standard) proves, through the presence of the following signals, that the new epoxide resin substantially consists of the substance of the formula given below:

| δ = 0.58 – 0.93 | (Multiplet) : | —CH$_2$—CH$_3$ |
| δ = 1.37) 1.48) | (Doublet) : | —C(—CH$_3$)— |
| δ = 1.55 – 2.0 | (Multiplet) : | —CH$_2$—CH$_3$ |

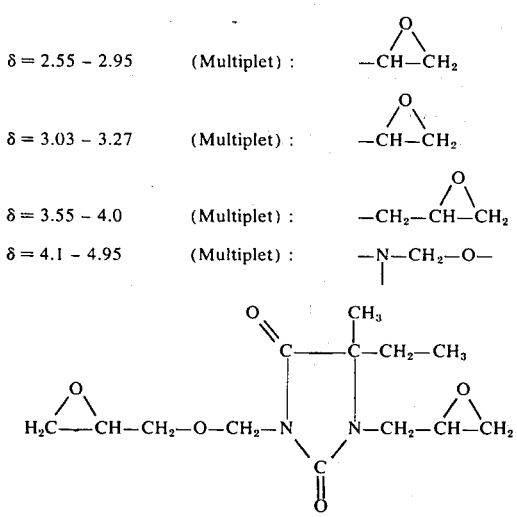

| δ = 2.55 – 2.95 | (Multiplet) : | —CH—CH₂ (epoxide) |
| δ = 3.03 – 3.27 | (Multiplet) : | —CH—CH₂ (epoxide) |
| δ = 3.55 – 4.0 | (Multiplet) : | —CH₂—CH—CH₂ (epoxide) |
| δ = 4.1 – 4.95 | (Multiplet) : | —N—CH₂—O— |

EXAMPLE 6

Glycidylation of 3-hydroxymethyl-5,5-dimethyl-5,6dihydrouracil 19.0 g of 3-hydroxymethyl-5,5-dimethyl-5,6-dihydrouracil (0.115 mol) together with 240 g of epichlorohydrin and 0.5 g of tetraethylammonium chloride are warmed at 60°C. Dehydrohalogenation is then carried out with 22.1 g of 50 % strength sodium hydroxide solution, as described in Example 1, over the course of 2 hours at 55°–58°C.

After working up according to Example 1, a practically colourless, viscous resin with 5.6 epoxide equivalents per kg (79 % of theory) is obtained.

B. Use Examples

EXAMPLE I 100 parts of the 3-glycidyloxymethyl-1-glycidyl-5,5-dimethylhydantoin manufactured according to Example 1, having 6.90 epoxide equivalents/kg, are mixed with 100 parts of hexahydrophthalic anhydride and 1 part of the curing accelerator benzyldimethylamine at 80°C, and poured into casting moulds of aluminium, prewarmed at 80°C. The mixture is first allowed to gel over the course of 4 hours at 80°C, and is then fully cured in 10 hours at 140°C. The shaped articles produced possess the mechanical properties listed below

| Flexural strength (VSM 77,103) | = 15–20 kp/mm² |
| Deflection (VSM 77,103) | = 7–11 mm |
| Impact strength (VSM 77,105) | = 17–22 cm.kp/cm² |
| Heat distortion point according to Martens (DIN 55,458) | = 125–135°C |
| Water absorption (4 days/20°) | = 0.4–0.5% |

EXAMPLE II 52.5 g of the 3-glycidyloxymethyl-1-glycidyl-5,5-dimethylhydantoin manufactured according to Example 1, having 6.9 epoxide equivalents/kg, are mixed with 44.0 g of phthalic anhydride at 115°C and the clear, homogeneous melt is poured into an aluminium mould prewarmed at 120°C. Curing takes place in 2 hours at 120°C and 15 hours at 150°C. A shaped article having the following mechanical properties is obtained:

| Flexural strength (VSM 77,103) | = 11–13 kp/mm² |
| Deflection (VSM 77,103) | = 3–5 mm |
| Heat distortion point according to Martens (DIN 55,458) | = 170°C |
| Water absorption (4 days/20°C) | = 0.58% |

EXAMPLE III

A homogeneous mixture of 77.3 g of the 3-glycidyloxymethyl-1-glycidyl-5-isopropylhydantoin manufactured according to Example 3, having 6.76 epoxide equivalents/kg, 72.3 g of hexahydrophthalic anhydride and 1.0 g of benzyldimethylamine is warmed to 80°C and poured into aluminium moulds prewarmed to 80°C. Curing takes place in 2 hours at 80°C and 12 hours at 150°C. The shaped articles thus obtained show the following properties:

| Flexural strength (VSM 77,103) | = 15.2 kp/mm² |
| Deflection (VSM 77,103) | = 5.0 mm |
| Tensile strength (VSM 77,101) | = 4.9 kp/mm² |
| Water absorption (4 days/20°C) | = 0.48% |

EXAMPLE IV 155 g of the 3-glycidyloxmethyl-1-glycidyl-5,5-tetramethylenehydantoin manufactured according to Example 4, having 6.77 epoxide equivalents/kg, are mixed with 145 g of hexahydrophthalic anhydride and 2.0 g of benzyldimethylamine at 70°C, and the mixture is poured into aluminium moulds prewarmed to 80°C. Curing takes place in 3 hours at 80°C and 12 hours at 150°C. The clear, transparent shaped articles thus obtained show the following mechanical and electrical properties:

| Flexural strength (VSM 77,103) | = 14–15 kp/mm² |
| Impact strength (VSM 77,105) | = 14–18 cm.kp/cm² |
| Water absorption (4 days/20°C) | = 0.43% |
| Tracking resistance (VDE), level | = KA 3c |
| Arcing resistance (DIN), level | = L 4 |
| Dielectric constant ε | |
| at 25°C | = 3.4 |
| at 100°C | = 3.4 |
| at 140°C | = 3.4 |
| at 160°C | = 3.5 |
| Dielectric loss factor tg δ (50 Hz) | |
| at 25°C | = 0.006 |
| at 100°C | = 0.005 |
| at 140°C | = 0.007 |
| 10% value of tg δ | = 180°C |
| Specific resistance, ρ, at 20°C | = 2.10¹⁶ Ω.cm |

EXAMPLE V

A mixture, prepared at 60°C, of 150 g of the 3-glycidyloxymethyl-1-glycidyl-5-ethyl-5-methylhydantoin manufactured according to Example 5, having 7.05 epoxide equivalents per kg, 150 g of hexahydrophthalic anhydride and 2.0 g of benzyldimethylamine is poured into aluminium moulds prewarmed to 80°C and cured in accordance with the temperature programme mentioned in Example IV. Articles having the following properties are obtained:

| Flexural strength (VSM 77,103) | = 14–16 kp/mm² |
| Deflection (VSM 77,103) | = 5–7 mm |
| Impact strength (VSM 77,105) | = 13–16 cmkp/cm² |
| Water absorption (4 days/20°C) | = 0.51% |
| Tracking resistance (VDE), level | = KA 3c |
| Arcing resistance (DIN), level | = L4 |
| Dielectric constant, ε, | |
| at 20°C | = 3.5 |
| at 120°C | = 3.5 |

-continued

Dielectric loss factor, tg δ (50 Hz)
at 25°C = 0.01
at 100°C = 0.009
10% value of tg δ = 150°C

EXAMPLE VI (Comparative Example)

147.5 parts of 1-glycidyl-3-(2-glycidyloxy-ethyl)5,5-dimethyl-hydantoin, having an epoxide content of 6.77 equivalents per kg, are mixed with 131.5 parts of hexahydrophthalic anhydride at 50°C and this mixture is poured into aluminium moulds of 4 mm wall thickness, pre-warmed to 80°C. The mixture is cured in 2 hours/80° and in 14 hours/140°C. Clear, transparent mouldings having the following properties are obtained:

Flexural strength (VSM) 16.0 kp/mm²
Deflection (VSM) 10.2 mm
Impact strength (VSM) 23.5 cm.kp/cm²
Heat distortion point according
to Martens (DIN) 105°C.

We claim:

1. A N-heterocyclic diglycidyl compound of the formula

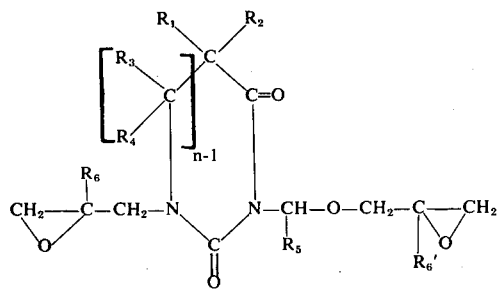

wherein $R_1$, $R_2$, $R_3$ and $R_4$ independently of one another each represents a member selected from the group consisting of hydrogen atom and alkyl with 1 to 4 carbon atoms, or wherein $R_1$ and $R_2$ together form a divalent aliphatic hydrocarbon radical selected from the group consisting of tetramethylene and pentamethylene, $R_5$ represents a hydrogen atom or the methyl group, $R_6$ and $R_6'$ independently of one another each represents a member selected from the group consisting of hydrogen atom and methyl group, and n denotes an integer having a value of 1 or 2.

2. A compound as claimed in claim 1 which is 3-glycidyloxymethyl-1-glycidyl-5,5-dimethylhydantoin.

3. A compound as claimed in claim 1 which is 3-(1'-glycidyloxyethyl)-1-glycidyl-5,5-dimethylhydantoin.

4. A compound as claimed in claim 1 which is 3-glycidyloxymethyl-1-glycidyl-5-isopropylhydantoin.

5. A compound as claimed in claim 1 which is 3-glycidyloxymethyl-1-glycidyl-5,5-tetramethylenehydantoin.

6. A compound as claimed in claim 1 which is 3-glycidyloxymethyl-1-glycidyl-5-ethyl-5-methylhydantoin.

7. A compound as claimed in claim 1 which is 3-glycidyloxymethyl-1-glycidyl-5,5-dimethyl-5,6-dihydrouracil.

* * * * *